(12) United States Patent
KN et al.

(10) Patent No.: US 11,063,426 B2
(45) Date of Patent: Jul. 13, 2021

(54) INTRINSIC SAFETY (IS) BARRIERS MOUNTABLE ON TERMINAL BLOCKS OF INPUT/OUTPUT (I/O) MODULES OR OTHER DEVICES

(71) Applicant: Honeywell International Inc., Morris Plains, NJ (US)

(72) Inventors: Dinesh Kumar KN, Bangalore (IN); Sai Krishnan Jagannathan, Bangalore (IN); Hemanth Vijaykumar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 409 days.

(21) Appl. No.: 16/043,288

(22) Filed: Jul. 24, 2018

(65) Prior Publication Data

US 2019/0123548 A1    Apr. 25, 2019

Related U.S. Application Data

(60) Provisional application No. 62/574,671, filed on Oct. 19, 2017.

(51) Int. Cl.
*H02H 9/00* (2006.01)
*G05B 19/042* (2006.01)
(Continued)

(52) U.S. Cl.
CPC ......... *H02H 9/008* (2013.01); *G05B 19/0425* (2013.01); *H02H 9/026* (2013.01);
(Continued)

(58) Field of Classification Search
CPC .... H02H 9/008; H02H 9/026; G05B 19/0425; G05B 2219/14011; G05B 2219/24028; G05B 2219/34481; H04L 25/0266
(Continued)

(56) References Cited

U.S. PATENT DOCUMENTS 3,973,170 A    8/1976 Hogan
4,001,797 A *  1/1977 Buss .................... H05K 7/1422
                                                  340/870.09
(Continued)

OTHER PUBLICATIONS

PEPPERL+FUCHS "Isolated Barriers" Nov. 2010 (Year: 2010).*
(Continued)

*Primary Examiner* — Kevin J Comber
(74) *Attorney, Agent, or Firm* — Paschall & Associates, LLC; Anthony Miologos

(57) ABSTRACT

A system includes a module having at least one input/output (I/O) channel. The system also includes a terminal block having terminals configured to provide electrical connections for the at least one I/O channel. The system further includes a barrier assembly having one or more intrinsic safety (IS) barriers. Each IS barrier is configured to receive at least one data or power signal, limit an amount of energy in the at least one data or power signal, and output the at least one energy-limited data or power signal. Each IS barrier includes at least one limiter circuit configured to limit the amount of energy in the at least one data or power signal. Each IS barrier is configured to be mounted on the terminal block. Each IS barrier could be configured to provide galvanic isolation between multiple devices or systems coupled to the IS barrier. Each limiter circuit could include a current limiter.

18 Claims, 7 Drawing Sheets

(51) Int. Cl.
*H02H 9/02* (2006.01)
*H04L 25/02* (2006.01)

(52) U.S. Cl.
CPC .............. *H04L 25/0266* (2013.01); *G05B 2219/14011* (2013.01); *G05B 2219/24028* (2013.01); *G05B 2219/34481* (2013.01)

(58) Field of Classification Search
USPC ........................................... 361/93.9
See application file for complete search history.

(56) References Cited

U.S. PATENT DOCUMENTS

| | | | |
|---|---|---|---|
| 4,412,265 A | 10/1983 | Buuck | |
| 4,954,923 A | 9/1990 | Hoeflich et al. | |
| 5,835,534 A | 11/1998 | Kogure | |
| 6,397,322 B1 | 5/2002 | Voss | |
| 6,513,086 B1 * | 1/2003 | Haddad | G06F 1/183 361/191 |
| 6,750,808 B2 | 6/2004 | Faust | |
| 6,992,467 B1 | 1/2006 | Fey | |
| 7,463,470 B2 | 12/2008 | Lark | |
| 7,746,613 B1 * | 6/2010 | Sherwin | H02H 9/004 361/93.1 |
| 9,680,261 B2 | 6/2017 | Arul et al. | |
| 2001/0034165 A1 * | 10/2001 | Landis | H01R 12/7076 439/716 |
| 2004/0066588 A1 | 4/2004 | Flasza et al. | |
| 2004/0252428 A1 | 12/2004 | Junker | |
| 2005/0024160 A1 | 2/2005 | Vazach et al. | |
| 2016/0146924 A1 | 5/2016 | Williams | |

OTHER PUBLICATIONS

"AN9003—A Users Guide to Intrinsic Safety", Cooper Crouse-Hinds MTL Inc., May 2013, 20 pages.
"TDC 3000X Galvanic Isolation/Intrinsic Safety Field Termination Assemblies Specification and Technical Data", GA03-100 R500 6/96, Honeywell Inc., 1995, 20 pages.
"Wiring Practices for Hazardous (Classified) Locations Instrumentation Part 1: Intrinsic Safety", ANSI/ISA-RP12.6-1995, Instrument Society of America, Aug. 1995, 52 pages.
Babiarz, "Intrinsic Safety Circuit Design", Instrument Society of America, Oct. 1993, pp. Z131-Z148.
Kumar KN et al., "Intrinsic Safety (IS) Barrier With Associated Energy Limiting Apparatus", U.S. Appl. No. 16/008,941, filed Jun. 14, 2018, 38 pages.
Pepperl Fuchs: Isolated Barriers 112 Subject to modifications without notice Peppel+Fuchs Group, Nov. 1, 2010, pp. 1-298.

* cited by examiner

INTRINSIC SAFETY (IS) BARRIERS MOUNTABLE ON TERMINAL BLOCKS OF INPUT/OUTPUT (I/O) MODULES OR OTHER DEVICES

CROSS-REFERENCE TO RELATED APPLICATION AND PRIORITY CLAIM

This application claims priority under 35 U.S.C. § 119(e) to U.S. Provisional Patent Application No. 62/574,671 filed on Oct. 19, 2017. This provisional application is hereby incorporated by reference in its entirety.

TECHNICAL FIELD

This disclosure generally relates to electrical safety barriers. More specifically, this disclosure relates to intrinsic safety (IS) barriers that are mountable on terminal blocks of input/output (I/O) modules or other devices.

BACKGROUND

Industrial process control and automation systems are often used to automate large and complex industrial processes. These types of systems routinely include various components including sensors, actuators, and controllers. Some of the controllers can receive measurements from the sensors, possibly through connected input/output (I/O) subsystems, and generate control signals for the actuators. Existing process control and automation systems typically have hardware components participating in control and I/O functions that are installed in control rooms and in the field. These hardware components are often used to gather I/O information from the field, transmit that I/O information to the control rooms, perform various control functions, and transmit I/O information back to the field.

In hazardous environments, it may be necessary or desirable to limit and isolate critical I/O functions or other functions using intrinsic safety (IS) barriers. Intrinsic safety barriers implement protection techniques that limit electrical or thermal energy available in the hazardous environments. This helps to ensure safe operation of electrical equipment in the hazardous environments and limits the electrical or thermal energy available for ignition in the hazardous environments. As a particular example, intrinsic safety barriers can be used to limit the electrical or thermal energy available in environments that contain flammable or explosive gasses, liquids, or other materials.

SUMMARY

This disclosure provides intrinsic safety (IS) barriers that are mountable on terminal blocks of input/output (I/O) modules or other devices.

In a first embodiment, an apparatus includes one or more intrinsic safety barriers. Each intrinsic safety barrier is configured to receive at least one data or power signal, limit an amount of energy in the at least one data or power signal, and output the at least one energy-limited data or power signal. Each intrinsic safety barrier includes at least one limiter circuit configured to limit the amount of energy in the at least one data or power signal. Each intrinsic safety barrier is configured to be mounted on a terminal block having multiple terminals.

In a second embodiment, a system includes a module having at least one I/O channel. The system also includes a terminal block having terminals configured to provide electrical connections for the at least one I/O channel. The system further includes a barrier assembly having one or more intrinsic safety barriers. Each intrinsic safety barrier is configured to receive at least one data or power signal, limit an amount of energy in the at least one data or power signal, and output the at least one energy-limited data or power signal. Each intrinsic safety barrier includes at least one limiter circuit configured to limit the amount of energy in the at least one data or power signal. Each intrinsic safety barrier is configured to be mounted on the terminal block.

In a third embodiment, a method includes mounting one or more intrinsic safety barriers on a terminal block, where the terminal block includes multiple terminals. The method also includes using each intrinsic safety barrier to receive at least one data or power signal, limit an amount of energy in the at least one data or power signal, and output the at least one energy-limited data or power signal. Each intrinsic safety barrier includes at least one limiter circuit configured to limit the amount of energy in the at least one data or power signal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
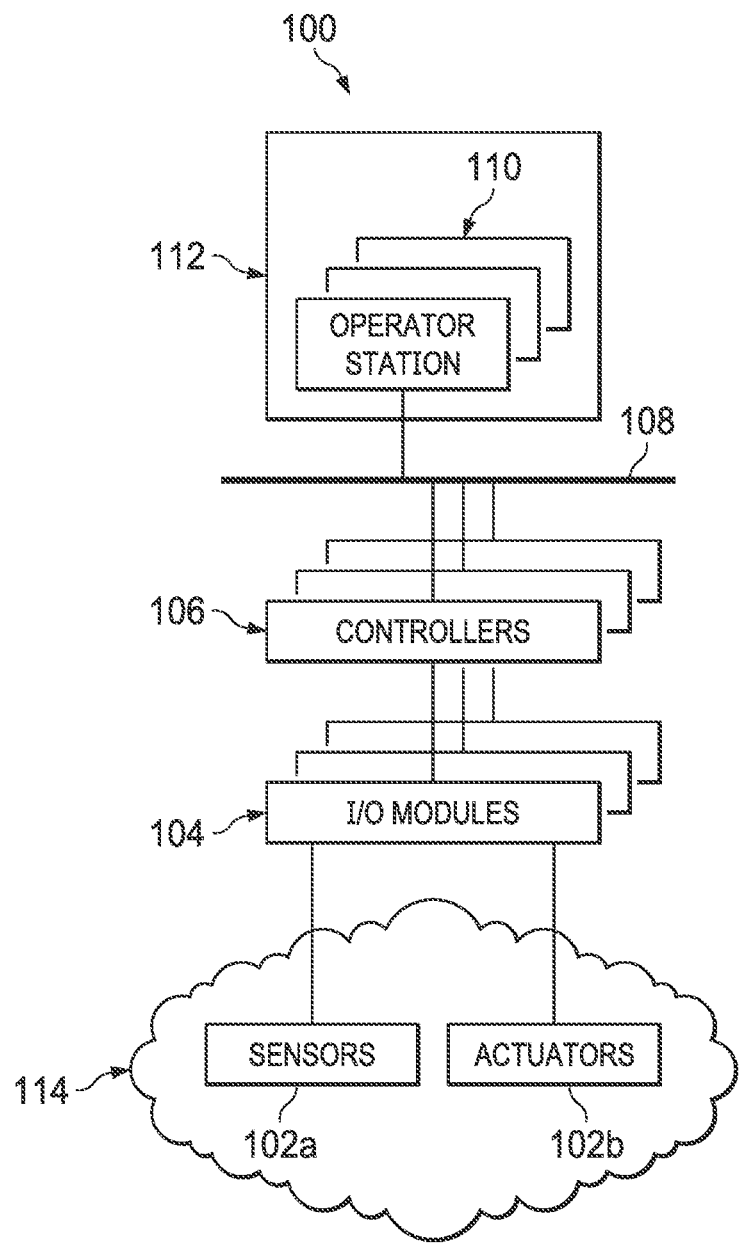
FIG. 1 illustrates an example industrial process control and automation system according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems typically have hardware components participating in various control and input/output (I/O) functions. In hazardous environments, it may be necessary or desirable to limit and isolate critical I/O functions or other functions using intrinsic safety (IS) barriers, which implement protection techniques that limit electrical or thermal energy available in the hazardous environments. This helps to ensure safe operation of electrical equipment in the hazardous environments and limits the electrical or thermal energy available for ignition in the hazardous environments. In other words, intrinsic safety barriers help to facilitate the use of electrical equipment in hazardous environments by reducing or eliminating the likelihood that the electrical equipment could cause explosions or other problems in the hazardous environments.

Conventional intrinsic safety barriers are often single-channel barriers, meaning each barrier can only be used with a single I/O channel. Conventional intrinsic safety barriers are also often general-purpose barriers, meaning the barriers are typically designed for a wide range of applications in various environments. As a result, a large number of intrinsic safety barriers may be needed in systems having a large number of I/O channels, and these intrinsic safety barriers may occupy a large amount of space. In some cases, a control room could need dedicated cabinets and power supplies just for single-channel intrinsic safety barriers.

This disclosure describes intrinsic safety barriers that are mountable on terminal blocks of I/O modules or other devices. A terminal block generally represents a structure having multiple connectors (such as screw terminals) that are configured to be coupled to wires or other electrically-conductive communication links. The communication links are used to communicatively couple an I/O module or other device to one or more additional devices. In the context of an industrial process control and automation system, for example, an I/O module could include at least one terminal block used to electrically couple the I/O module to multiple sensors, actuators, or other field devices.

It is possible for a large number of intrinsic safety barriers to be compactly mounted on the terminal blocks of the I/O modules or other devices. In this way, the intrinsic safety barriers can provide improved channel densities, improved or optimized space utilization, and reduced costs. For example, there may be less or no need to provide separate cabinets and power supplies for the intrinsic safety barriers. Moreover, the described approaches can be used with various types of I/O channels, such as traditional I/O channels, universal I/O channels, or other suitable I/O channels or combinations of I/O channels.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one I/O module 104 is coupled to the sensors 102a and actuators 102b. The I/O modules 104 facilitate interactions with the sensors 102a, actuators 102b, or other field devices. For example, an I/O module 104 could be used to receive one or more analog inputs (AIs), digital inputs (DIs), digital input sequences of events (DISOEs), pulse accumulator inputs (PIs), or other inputs from one or more field devices. An I/O module 104 could also be used to provide one or more analog outputs (AOs), digital outputs (DOs), or other outputs to one or more field devices. As described below, the interactions with one or more field devices occur through one or more intrinsic safety barriers. Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O modules 104. A second set of controllers 106 could be used to optimize the control logic or other operations performed by the first set of controllers. A third set of controllers 106 could be used to perform additional functions. It is also possible that one set of controllers could be in a stand-by or load sharing mode to improve overall availability of the system.

Controllers 106 are often arranged hierarchically in a system. For example, different controllers 106 could be used to control individual actuators, collections of actuators forming machines, collections of machines forming units, collections of units forming plants, and collections of plants forming an enterprise. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

The one or more networks 108 couple the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various controllers 106 and operator stations 110 in FIG. 1 may represent computing devices. For example, each of the controllers and operator stations could include one or more processing devices, such as one or more microprocessors, microcontrollers, digital signal processors (DSPs), field programmable gate arrays (FPGAs), application specific integrated circuits (ASICs), or discrete circuitry. Each of the controllers 106 and operator stations 110 could also include one or more memories for storing instructions and data used, generated, or collected by the processing device(s), such as a random access memory, read only memory, Flash memory, optical disc, hard drive, or any other suitable volatile or non-volatile storage device(s). Each of the controllers 106 and operator stations 110 could further include at least one network interface, such as one or more Ethernet interfaces or wireless transceivers.

In process control and automation systems such as the system 100, I/O channels are used to connect controllers (such as the controllers 106) and field devices (such as the sensors 102a and actuators 102b). In general, the I/O modules 104 or other devices can support I/O channels of various types, including AIs, DIs, DISOEs, PIs, AOs, or DOs. Different I/O channel types are characterized by different inputs, outputs, voltages, currents, and configurations. A universal I/O (UIO) channel is a specialized I/O channel that is reconfigurable to operate as any of multiple I/O channel types. Example types of UIO circuits are shown in U.S. Pat. Nos. 8,072,098; 8,392,626; 8,656,065; and U.S. Patent Publication No. 2015/0278144 (all of which are hereby incorporated by reference in their entirety). UIO circuits that support UNIVERSAL CHANNEL TECHNOLOGY available from HONEYWELL INTERNATIONAL INC. are also suitable for use.

As described in more detail below, the I/O modules 104 or other components of the system 100 can include intrinsic safety (IS) barriers that allow sensors, actuators, or other field devices to be used in hazardous environments or other environments. In this example, the sensors 102a and actuators 102b are used in a hazardous environment 114, which may also be referred to a hazardous location or "HazLoc" area. These intrinsic safety barriers could be designed to provide galvanic isolation (GI) for the sensors, actuators, and other field devices while being mountable directly on the terminal blocks of the I/O modules 104 or other components. In this document, the phrase "terminal block" refers to a structure having multiple connector points, where electrical connections can be made with the connector points. Terminal blocks include field cable interface connectors or other structures having multiple electrical terminals (such as screw terminals) or other connector points.

As noted above, conventional intrinsic safety barriers are often single-channel and general-purpose barriers. As a result, a large number of intrinsic safety barriers may occupy a large amount of space in various systems. By using intrinsic safety barriers that are mountable directly on the terminal blocks of I/O modules 104 or other components, the intrinsic safety barriers disclosed here can provide improved channel densities, improved or optimized space utilization, and reduced costs. The intrinsic safety barriers disclosed here can also be used with traditional I/O channels, universal I/O channels, or other suitable I/O channels or combinations of I/O channels. In some embodiments, each I/O module 104 could support up to sixteen or thirty-two I/O channels and include an intrinsic safety barrier for each I/O channel. However, these numbers are examples only, and other numbers of I/O channels and intrinsic safety barriers could be used. Also, it may not be necessary for every I/O channel of an I/O module or other device to include an intrinsic safety barrier, such as when one or more field devices are not located in a hazardous location.

Additional details regarding example intrinsic safety barriers that are mountable on terminal blocks of I/O modules or other devices are provided below. Note that these details relate to specific implementations of intrinsic safety barriers and that other embodiments of the intrinsic safety barriers could also be used. For example, specific voltages, numbers of I/O modules/channels/intrinsic safety barriers, and redundancy configurations may be described below, although any other suitable values could be used.

Although FIG. 1 illustrates one example of an industrial process control and automation system 100, various changes may be made to FIG. 1. For example, the system 100 could include any number of sensors, actuators, I/O modules, controllers, operator stations, networks, IS barriers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which one or more intrinsic safety barriers can be used. This functionality can be used in any other suitable system, and the system need not be related to industrial process control and automation.

Figure 2:
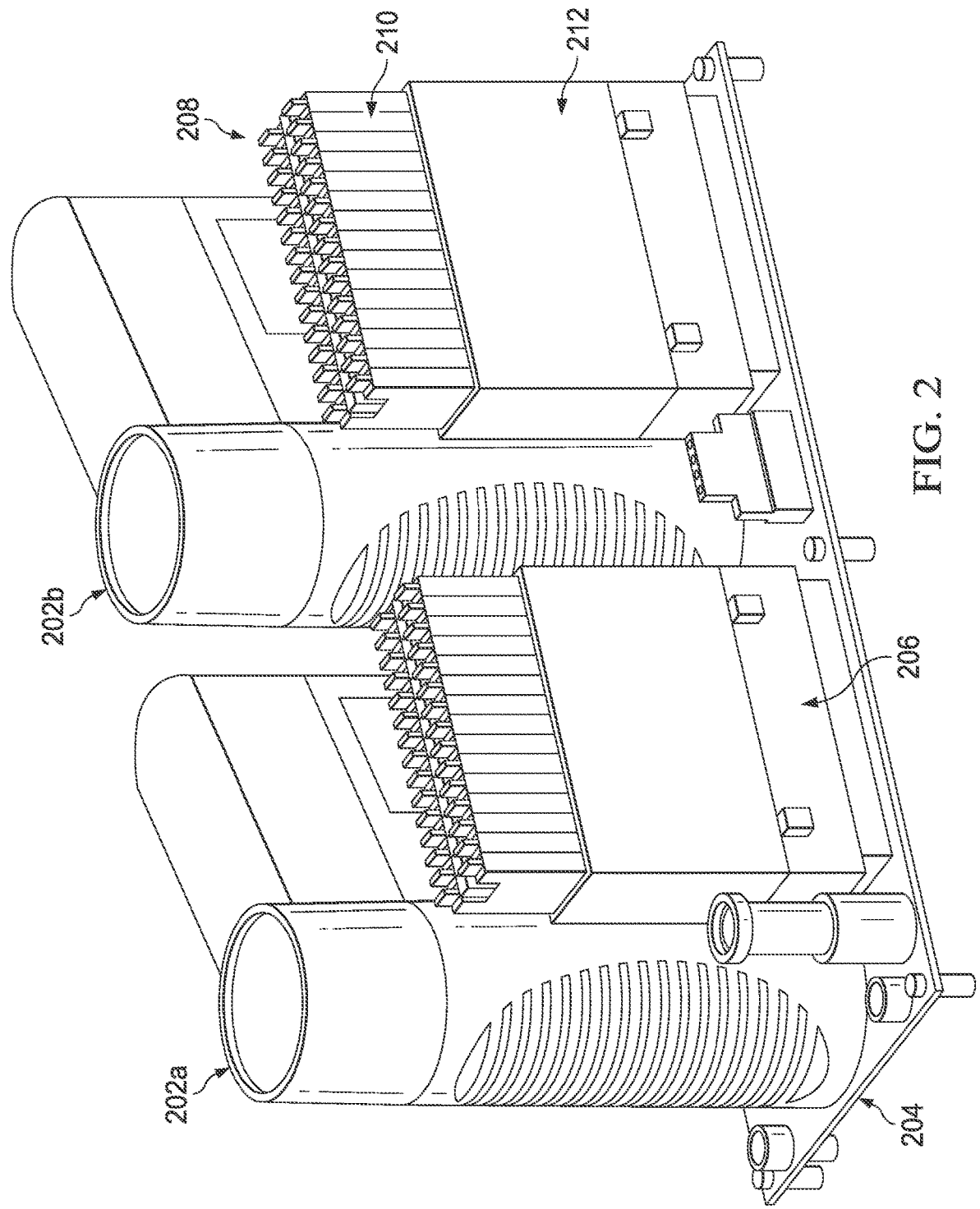
FIGS. 2 and 3 illustrate an example mounting of intrinsic safety barriers on terminal blocks of input/output (I/O) modules or other devices according to this disclosure.
Figure 3:
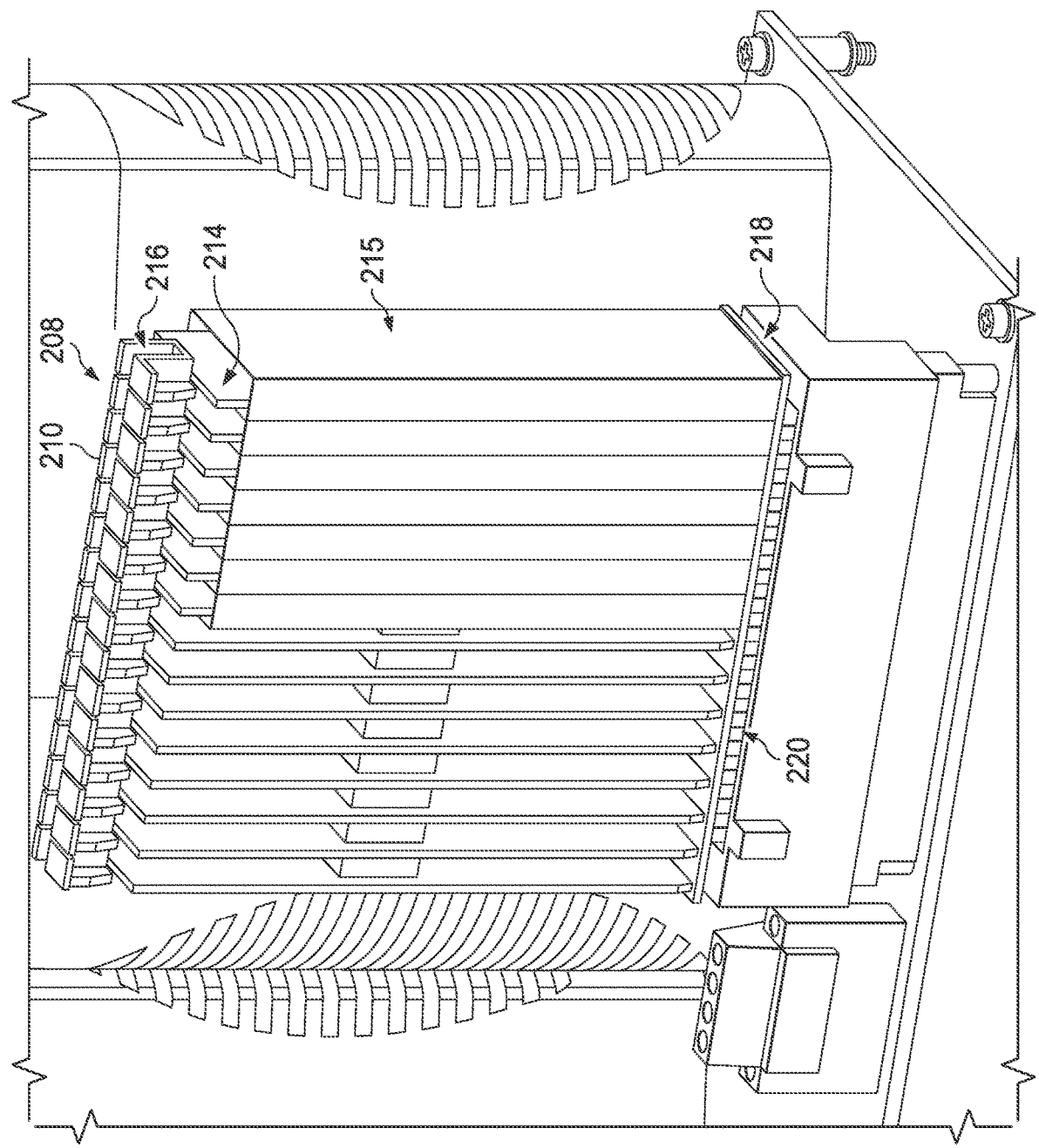

FIGS. 2 and 3 illustrate an example mounting of intrinsic safety barriers on terminal blocks of I/O modules or other devices according to this disclosure. For ease of explanation, the mounting of the intrinsic safety barriers may be described as involving the use of one or more I/O modules 104 in the system 100 of FIG. 1. However, the intrinsic safety barriers may be used with any suitable device(s) and in any suitable system (whether or not related to industrial process control and automation). Also, for ease of explanation, the intrinsic safety barriers here may be described as representing multiple instances of the intrinsic safety barrier shown in FIG. 4 and described below. However, any other suitable intrinsic safety barriers could be used here.

As shown in FIGS. 2 and 3, one or more modules 202a-202b are mountable on an Input/Output Termination Assembly ("IOTA") 204. Each module 202a-202b could perform any suitable functionality. For example, the modules 202a-202b could represent industrial process controllers or I/O modules. In some embodiments, the modules 202a-202b could denote a redundant pair of modules, where one module 202a-202b operates in a primary mode and the other module 202a-202b operates in a secondary or backup mode. In particular embodiments, a primary process controller could operate to control an industrial process (or portion thereof), while a secondary process controller synchronizes with the primary process controller and is ready to take over control if the primary process controller fails. In other particular embodiments, a pair of I/O modules could be used in a redundant manner to maintain communication with one or more field devices in the event that one of the I/O modules fails or experiences a communication fault or other fault.

The IOTA 204 generally denotes a structure through which other components (such as the modules 202a-202b) communicate with other devices (such as field devices or I/O modules). The IOTA 204 here includes one or more terminal blocks 206, each of which represents a collection of terminals that can be coupled to physical communication lines or other links to other devices in order to facilitate the transport of I/O signals to or from the IOTA 204. The IOTA 204 could also include a circuit board or other substrate containing conductive traces or other pathways communicatively coupling the modules 202a-202b and the one or more terminal blocks 206. Each terminal block 206 denotes any suitable collection of I/O terminals, such as a collection of screw terminals.

An isolation barrier assembly 208 can be mounted on each terminal block 206. Each isolation barrier assembly 208 represents a collection of intrinsic safety barriers 210 (each of which could represent the intrinsic safety barrier 400 discussed below or any other suitable intrinsic safety barrier) that can be coupled to the terminals of the corresponding terminal block 206 in order to provide intrinsic safety protection. Each isolation barrier assembly 208 includes any suitable number of intrinsic safety barriers 210. In some embodiments, each isolation barrier assembly 208 includes sixteen intrinsic safety barriers 210, although other numbers of intrinsic safety barriers 210 could be used.

As shown here, the isolation barrier assembly 208 includes a housing 212 that at least partially encloses the intrinsic safety barriers 210. The housing 212 could be formed from any suitable material(s) and in any suitable manner. In some embodiments, the housing 212 could be formed from metal or ruggedized plastic. Note that the housing 212 could enclose any suitable portion of the intrinsic safety barriers 210.

Each intrinsic safety barrier 210 includes a circuit board assembly 214, a sleeve 215, and a handle 216. The circuit board assembly 214 includes a circuit board or other substrate and circuit components that implement the functionality of the intrinsic safety barrier 210. For example, the circuit board assembly 214 could include circuit components that implement the functionality of various components shown in FIG. 4. The sleeve 215 denotes a structure that receives a circuit board assembly 214 and that electrically isolates the circuit board assembly 214 from nearby components or otherwise protects the circuit board assembly 214. For instance, multiple sleeves 215 can help to prevent circuit components on different circuit board assemblies 214 from electrically contacting one another, which helps to prevent short circuits or other damage to the intrinsic safety barriers 210. The sleeve 215 could be formed from any suitable material(s) and in any suitable manner. In some embodiments, the sleeve 215 could be formed from a non-conductive material such as plastic. The handle 216 denotes a structure that can be grasped by a person or machine to facilitate insertion and removal of the intrinsic safety barrier 210 or the circuit board assembly 214. As shown here, the circuit board assemblies 214 can be arranged to be substantially parallel to one another to help minimize a size of the isolation barrier assembly 208.

A bottom end of each circuit board assembly 214 in FIGS. 2 and 3 could include one or more electrical connectors that allow for electrical connection of the circuit board assembly 214 to an adapter board 218. The adapter board 218 includes or is coupled to various electrical connectors 220. Each of the electrical connectors 220 can be inserted into a terminal block 206 and form an electrical connection to a terminal of the terminal block 206. The adapter board 218 provides electrical connections between the electrical connectors 220 and the circuit board assemblies 214. The adapter board 218 can also allow the circuit board assemblies 214 to be spaced at a larger interval than the terminals of the terminal block 206, which may be needed to provide the physical space for the circuit board assemblies 214. Note, however, that the use of a separate adapter board 218 and separate electrical connectors 220 may not be needed, such as when suitable electrical connectors 220 are placed on the circuit board assemblies 214 themselves (so that the connectors 220 on the circuit board assemblies 214 can be inserted directly into the terminal block 206).

As can be seen in FIGS. 2 and 3, it is possible to mount numerous intrinsic safety barriers 210 on each terminal block 206 of the IOTA 204. In this example, the isolation barrier assembly 208 on each terminal block 206 does not extend beyond the lateral edges of the IOTA 204 or above the tops of the modules 202a-202b. As a result, the intrinsic safety barriers 210 in the isolation barrier assemblies 208 can fit within the space that is normally occupied by the modules 202a-202b and IOTA 204 in a rack or other structure. The presence of the isolation barrier assemblies 208 on the terminal blocks 206 would not force other components or otherwise to be removed from the rack or other structure in order to make room for the intrinsic safety barriers 210.

Although FIGS. 2 and 3 illustrate one example of the mounting of intrinsic safety barriers on terminal blocks of I/O modules or other devices, various changes may be made to FIGS. 2 and 3. For example, a system could include any number of modules, IOTAS, terminal blocks, and intrinsic safety barriers. Also, the design and form of the intrinsic safety barriers in FIGS. 2 and 3 are examples only. Further, intrinsic safety barriers that are mountable on terminal blocks could be used with any other suitable devices and are not limited to use with modules coupled to an IOTA. In addition, it may not be necessary for every I/O channel passing through the terminal blocks 206 to include an intrinsic safety barrier.

Figure 4:
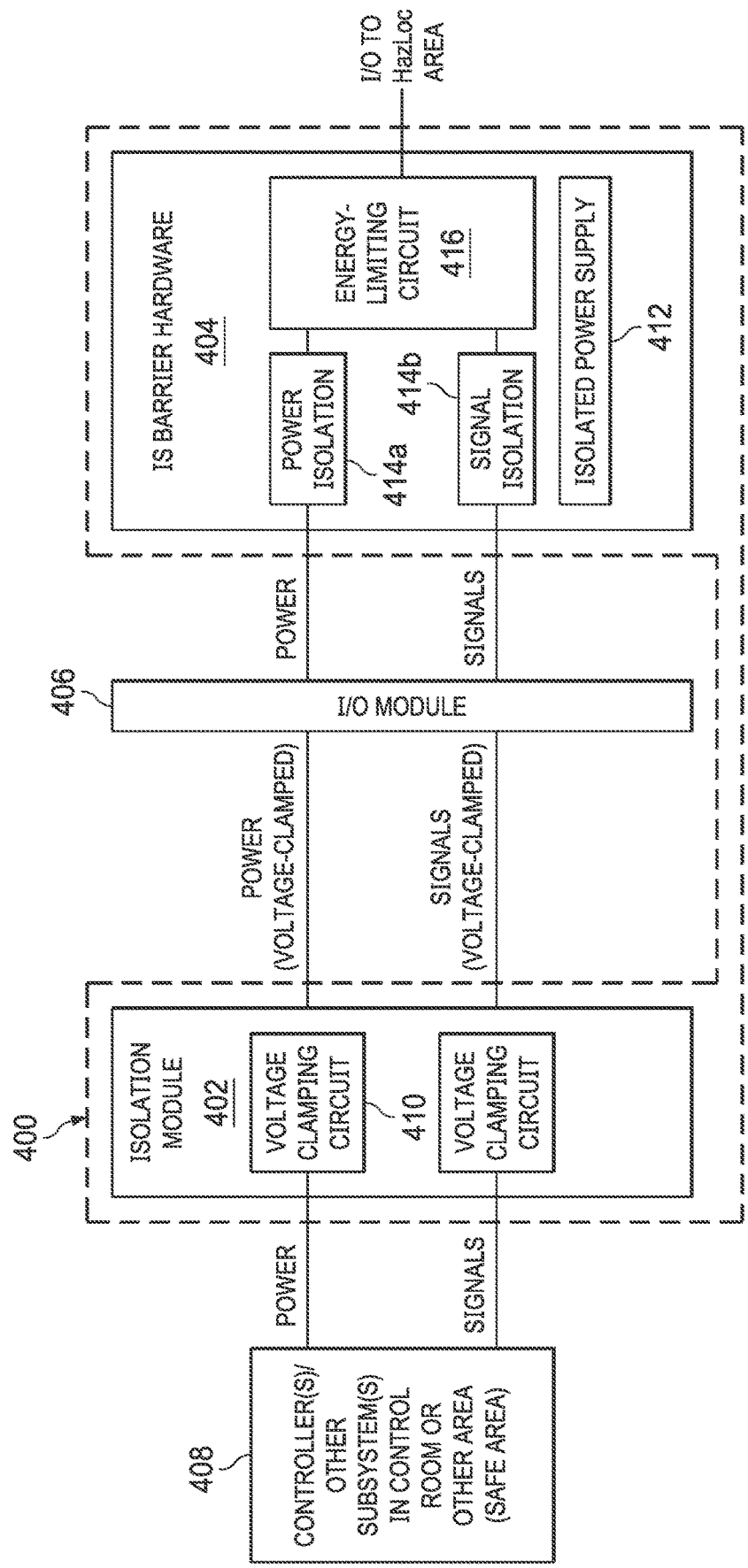
FIG. 4 illustrates an example intrinsic safety barrier that is mountable on a terminal block of an I/O module or other device according to this disclosure.

FIG. 4 illustrates an example intrinsic safety barrier 400 that is mountable on a terminal block of an I/O module or other device according to this disclosure. For ease of explanation, the intrinsic safety barrier 400 may be described as being used as the intrinsic safety barriers 210 in FIGS. 2 and 3 with the I/O modules 104 in the industrial process control and automation system 100 of FIG. 1. However, one or more intrinsic safety barriers 400 could be used with any suitable device(s) and in any suitable system (whether or not related to industrial process control and automation). Also, note that the intrinsic safety barrier 400 may be described below in the context of a specific intrinsic safety standard, such as IEC 60079-xx. However, compliance with other intrinsic safety standards is also possible.

According to IEC 60079-11, any signal coming from a safe area is considered as a potential carrier of 250V, which needs to be voltage-clamped and energy-limited before passing to a hazardous location. This 250V assessment is often difficult for barrier certification, which can result in the selection of bulky protection devices that increase the size and cost of the barrier and reduce channel density. To help with these or other issues, the intrinsic safety barrier 400 in FIG. 4 is split into two separate hardware components, namely an isolation module 402 and IS barrier hardware 404. The isolation module 402 and the IS barrier hardware 404 are used in conjunction with at least one I/O module 406, which could represent any of the I/O modules 104 of FIG. 1 or either of the modules 202a-202b of FIGS. 2 and 3. Among other things, this division helps to facilitate easier safety assessment of the intrinsic safety barrier 400. Note, however, that the use of the isolation module 402 may not be needed.

The isolation module 402 operates to clamp power or communication signals from a controller or other subsystem 408 in a safe area, such as to a voltage that complies with a relevant safety standard (like IEC 60079-xx). In some embodiments, the isolation module 402 can clamp power or communication signals from 250V to a much lower voltage. Thus, the isolation module 402 could be assessed for 250V and can optionally have an isolating element. Depending on the implementation, the isolation module 402 could perform voltage clamping and galvanic isolation for the power and communication signals. In particular embodiments, the isolation module 402 can perform voltage clamping and galvanic isolation for both serial communication (such as RS485) and DC power (such as 24 VDC) coming from a controller cabinet or other source, although other power or communication signals could be used. Also, in particular embodiments, the isolation module 402 could be implemented according to suitable guidelines for use in a "zone 0," "zone 1," or "zone 4" environment.

As described in more detail below, in some embodiments, one or more voltage clamping circuits 410 can be used in the isolation module 402. Each voltage clamping circuit 410 could be passive or active. This portion of the intrinsic safety barrier 400 may require an "ia," "ib," "ic," or other safety assessment since the outputs of the isolation module 402 are fed to another subsystem that includes the IS barrier hardware 404. Each voltage clamping circuit 410 could therefore undergo an "ia," "ib," or "ic" assessment for 250V inputs, as well as for thermal assessment. Galvanic isolation could be provided before or after an active voltage clamp (if used). Each voltage clamping circuit 410 includes any suitable structure for limiting the voltage of a power signal or at least one communication signal. In some embodiments, resistive elements could be used as a power and current limiting circuit for communication channels or other channels carrying data signals to or from a safe area. Suitable isolation techniques (such as opto, transformer, or capacitive) may be implemented for channels carrying data signals.

Outputs of the isolation module 402 can be functionally the same as inputs of the isolation module 402, but (as far as the safety assessment is concerned) the outputs of the isolation module 402 are voltage-limited. In some cases, the outputs are voltage-limited to a voltage lower than 250V, although the exact value depends on the design. Subsequent systems connecting to the outputs of the isolation module 402 would not need go through a 250V or other assessment for IS purposes. This is because the subsequent systems connecting to the outputs of the isolation module 402 would only receive voltage-clamped signals from the isolation module 402.

In some embodiments, multiple instances of the isolation module 402 could be used, and one or multiple instances of the IS barrier hardware 404 can be coupled to the outputs of each of the isolation modules 402. Also, in some embodiments, each of the isolation modules 402 could be installed in a safe zone, "zone 0," "zone 1," or "zone 4." Further, in some embodiments, isolation modules 402 can optionally have a 1:1 redundancy or other redundancy configuration to improve overall system availability. Note that an isolation module 402 by itself need not be certified as a subsystem; rather, certification may only be needed when the isolation module 402 is used in combination with the IS barrier hardware 404.

The IS barrier hardware 404 provides energy limiting and isolation circuitry for one or more I/O channels supported by the I/O module(s) 406. However, the IS barrier hardware 404 does not need to be assessed for 250V or other voltage clamping functionality for IS compliance since the inputs to the IS barrier hardware 404 come through the isolation module 402 (which does comply with 250V or other assessment outputs). Thus, the inputs to the IS barrier hardware 404 are already safety-assessed for a lower voltage. The energy limiting and isolation circuitry of the IS barrier hardware 404 can still be assessed for intrinsic safety, such as per the IEC 60079-11 standard or other suitable standard.

As described in more detail below, in some embodiments, the IS barrier hardware 404 includes an isolated power supply 412, isolators 414a-414b for power and communication signals, and at least one current limiter or other energy-limiting circuit 416. The isolated power supply 412 includes any suitable source of electrical power that provides electrical isolation. For example, the isolated power supply 412 could include a transformer that operates as an isolating element. Each isolator 414a-414b includes any suitable structure for providing electrical isolation for power or at least one communication signal. For instance, the isolators 414a-414b for power and communication signals could include opto, transformer, or capacitive elements that operate as isolating elements. Each energy-limiting circuit 416 includes any suitable structure for limiting electrical energy provided from the IS barrier hardware 404. As an example, the energy-limiting circuit 416 could be implemented using resistive elements near the outputs of the IS barrier hardware 404.

Multiple instances of the IS barrier hardware 404 could be interfaced to one isolation module 402 to help control the overall cost of the intrinsic safety barrier 400. However, multiple isolation modules 402 (each with one or multiple instances of the IS barrier hardware 404) could also be used. In specific embodiments, two isolation modules 402 provide 1:1 redundancy and are coupled to two I/O modules 406 (which also provide 1:1 redundancy), and one instance of the IS barrier hardware 404 is coupled to each I/O channel of each I/O module 406. In some embodiments, one or more isolation modules 402 and one or more IS barrier hardware 404 are packaged for installation directly on a terminal block of an I/O module 406. In other embodiments, one or more IS barrier hardware 404 are packaged for installation directly on a terminal block of an I/O module 406, while one or more isolation modules 402 are not installed on the terminal block of the I/O module 406. Thus, the isolation modules 402, IS barrier hardware 404, and I/O module 406 can be installed within the same cabinet or other structure.

In this type of design approach, intrinsic safety can be provided at a lower cost and smaller space per channel, which can allow for an improved channel density. Moreover, the smaller size of the intrinsic safety barrier 400 can help with integration within larger devices or systems, as well as with the overall cost for a project. Further, the intrinsic safety barrier 400 could find use in a large number of hardware devices. In addition, the IS barrier hardware 404 does not need to go through 250V or other safety assessment, which can provide tremendous advantages for designers with respect to component ratings, sizes, channel densities, and hardware costs. This helps in the development of hardware with high channel densities and lower costs, which is typically not possible with existing third-party solutions.

Note that a number of other features could also be supported by the intrinsic safety barrier 400. For example, the isolation module 402 and the IS barrier hardware 404 could be packaged as separate subsystems. The intrinsic safety barrier 400 could support the use of any suitable type(s) and number(s) of I/O channels in any suitable combination, including fixed and universal I/O channels. Each instance of the isolation module 402 and of the IS barrier hardware 404 could be independently accessed and replaced while keeping one or more controllers "on process" (meaning the one or more controllers maintain constant control over an industrial process or portion thereof). Each instance of the isolation module 402 and of the IS barrier hardware 404 could be approved for live insertion and removal.

Although FIG. 4 illustrates one example of an intrinsic safety barrier 400 that is mountable on a terminal block of an I/O module or other device, various changes may be made to FIG. 4. For example, the intrinsic safety barrier 400 could include any suitable number of isolation modules 402 and IS barrier hardware 404 and could be used in conjunction with any suitable number of I/O modules 406. Also, an intrinsic safety barrier that is directly mountable on a terminal block could have any other suitable design, and such a design may or may not use separate isolation modules 402 and IS barrier hardware 404 as shown here. The intrinsic safety barrier 400 shown in FIG. 4 is merely one example type of intrinsic safety barrier that could be at least partially mountable on a terminal block. Further, the intrinsic safety barrier 400 could be used with any other suitable device(s) and need not be used with an I/O module. In addition, an intrinsic safety barrier that is directly mountable on a terminal block could support a wide variety of other functions, such as signal conditioning.

Figure 5:
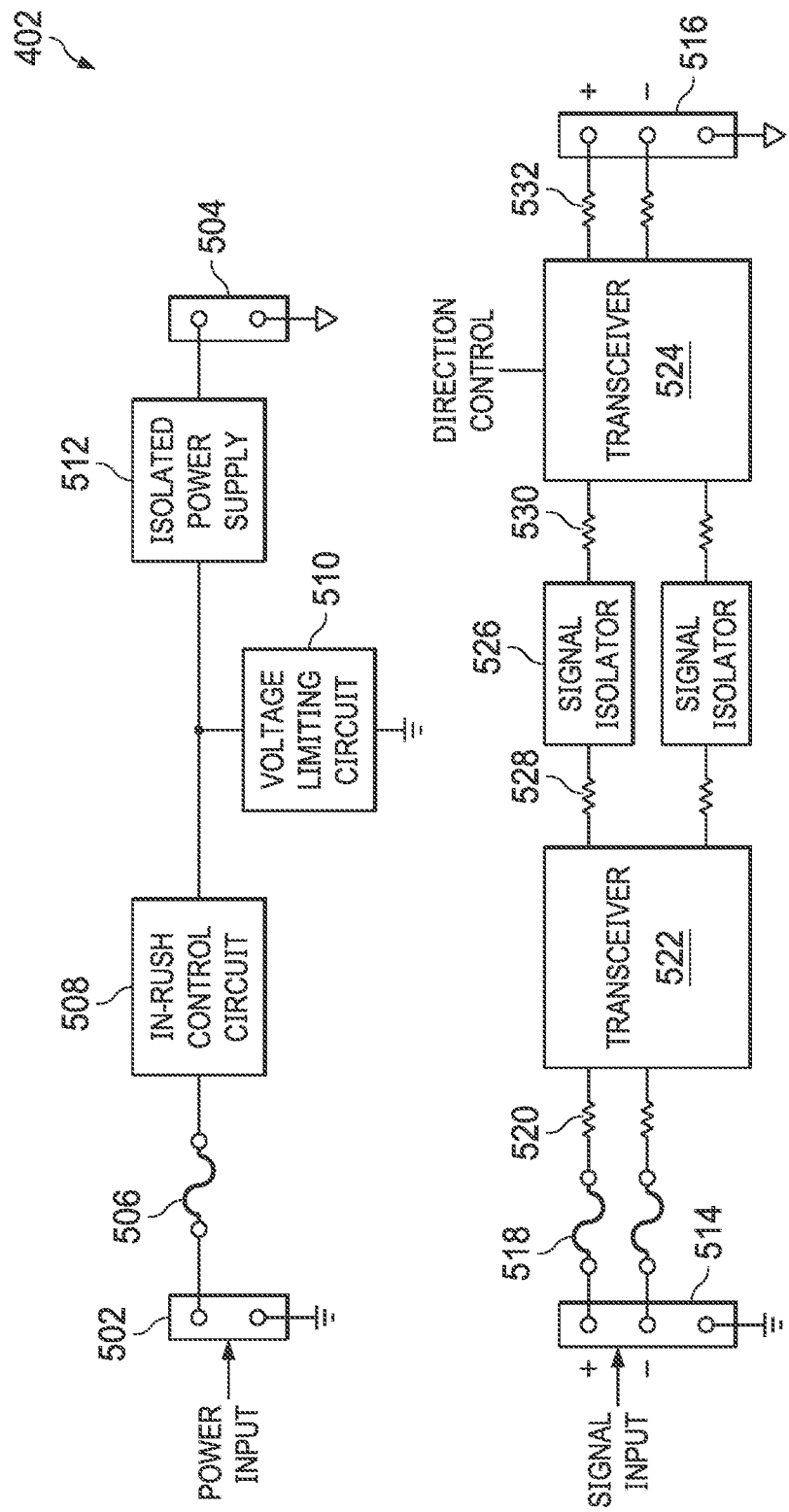
FIG. 5 illustrates an example implementation of an isolation module in the intrinsic safety barrier of FIG. 4 according to this disclosure.

FIG. 5 illustrates an example implementation of an isolation module 402 in the intrinsic safety barrier 400 of FIG. 4 according to this disclosure. The components forming the isolation module 402 could, for example, reside on the circuit board assembly 214 used within an intrinsic safety barrier 210. However, as noted above, the isolation module 402 could be separate from the IS barrier hardware 404, so the isolation module 402 need not reside on the circuit board assembly 214 of an intrinsic safety barrier 210. Note that the example implementation of the isolation module 402 shown in FIG. 5 is for illustration only. The isolation module 402 could be implemented in any other suitable manner without departing from the scope of this disclosure.

As shown in FIG. 5, the isolation module 402 includes a first input connector 502 and a first output connector 504. The input connector 502 is configured to receive an input power signal into the isolation module 402, and the output connector 504 is configured to provide a voltage-clamped output power signal from the isolation module 402. Each connector 502 and 504 includes any suitable structure configured to receive or provide an electrical signal, such as a 24 VDC signal.

The input power signal passes through the input connector 502 and is received at a fuse 506. The fuse 506 represents a structure configured to break in order to prevent excessive current from flowing further into the isolation module 402. An in-rush control circuit 508 is configured to receive the input power signal through the fuse 506 and to limit the current passing through the control circuit 508, such as when the isolation module 402 is initially powered-on. The in-rush control circuit 508 can also perform other functions, such as by providing short-circuit protection and reverse polarity protection.

A voltage limiting circuit 510 is coupled to the output of the in-rush control circuit 508. The voltage limiting circuit 510 generally operates to prevent an overvoltage condition from propagating to downstream components coupled to the output connector 504. For example, the voltage limiting circuit 510 could selectively create one or more short-circuit or low-resistance paths to ground when an overvoltage condition occurs. In some embodiments, the voltage limiting circuit 510 can withstand a 250V input and allow a significantly smaller voltage to be passed to the output connector 504. The voltage limiting circuit 510 could also have a rapid response time, such as about 10 µs or less. In addition, the voltage limiting circuit 510 could maintain a suitable temperature during a fault condition. The voltage limiting circuit 510 includes any suitable structure configured to protect against an overvoltage condition, such as one or more crowbar circuits.

An optional isolated power supply 512 can be positioned between (i) the in-rush control circuit 508 and the voltage limiting circuit 510 and (ii) the output connector 504. The isolated power supply 512 receives the input power signal from the in-rush control circuit 508 and provides a voltage-clamped output power rail to the output connector 504. The isolated power supply 512 also helps to electrically isolate the in-rush control circuit 508 and the voltage limiting circuit 510 from the output connector 504. In some embodiments, the isolated power supply 512 includes a transformer. In particular embodiments, the isolated power supply 512 is designed to comply with an IEC 60079-xx standard or other similar standard in order to support use in a HazLoc area.

The isolation module 402 also includes a second input connector 514 and a second output connector 516. The input connector 514 is configured to receive an input data signal into the isolation module 402, and the output connector 516 is configured to provide a voltage-clamped output data signal from the isolation module 402. Each connector 514 and 516 includes any suitable structure configured to receive or provide a data signal. Note that in this example, the input data signal is a differential data signal, such as an RS485 signal, so there are positive and negative terminals in the connectors 514 and 516, as well as separate electrical paths for the positive and negative portions of the input data signal. However, this is not required, and a single-ended input data signal could be used here.

The two portions of the input data signal pass through the input connector 514 and are received at respective fuses 518. Each fuse 518 represents a structure configured to break in order to prevent excessive current from flowing further into the isolation module 402. The two portions of the input data signal also pass through respective protection circuits 520, each of which is implemented in this example using a resistor. In some embodiments, each protection circuit 520 can withstand a 250V input.

Two transceivers 522 and 524 are used to transmit the two portions of the input data signal across respective signal isolators 526. For example, the transceiver 522 could receive the input data signal from the protection control circuits 520, regenerate the input data signal if needed, and transmit the input data signal towards the signal isolators 526. The transceiver 524 could receive signals from the signal isolators 526, regenerate the input data signal, and transmit the regenerated input data signal towards the output connector 516. Optionally, data can flow in both directions through the isolation module 402, and one or both transceivers 522 and 524 could be configured to receive a data direction control signal that controls the direction of data transport.

Each transceiver 522 and 524 includes any suitable structure for transmitting or receiving a data signal, such as an RS485 or other serial data transceiver. Note that while transceivers are shown here, one transceiver 522 or 524 could represent a transmitter and the other transceiver 524 or 522 could represent a receiver if data transport occurs in a single direction through the isolation module 402. Each signal isolator 526 includes any suitable structure for electrically isolating a data communication pathway. For example, each signal isolator 526 could include an opto-isolator that uses a photodiode to convert an electrical signal into light and a photodetector to convert the light back into an electrical signal. However, other isolation techniques (such as transformer or capacitive techniques) could be used here.

For each of the two portions of the input data signal, a respective resistor 528 and a respective resistor 530 are positioned on opposite sides of each isolator 526. Moreover, a respective resistor 532 is positioned between the transceiver 524 and the output connector 516. Each resistor 528-532 could have any suitable resistance. Note that a voltage limiting circuit could also be used for the signal paths.

In particular embodiments, the components in the isolation module 402 can be configured for use in a wide temperature range, such as between about −40° C. and +70° C. Also, in particular embodiments, the components in the isolation module 402 can undergo an "ia" assessment or other suitable assessment. Further, in particular embodiments, a redundant pair of isolation modules 402 can be used in each of multiple columns of a cabinet. Of course, one or more isolation modules 402 could be used in any other suitable manner.

Although FIG. 5 illustrates one example implementation of an isolation module 402 in the intrinsic safety barrier 400 of FIG. 4, various changes may be made to FIG. 5. For example, while specific components and specific values are provided above, these are examples only, and any other suitable components or values could be used in the isolation module 402. Also, if a single-ended input data signal is received, a single path may be used between the input connector 514 and the output connector 516.

Figure 6:
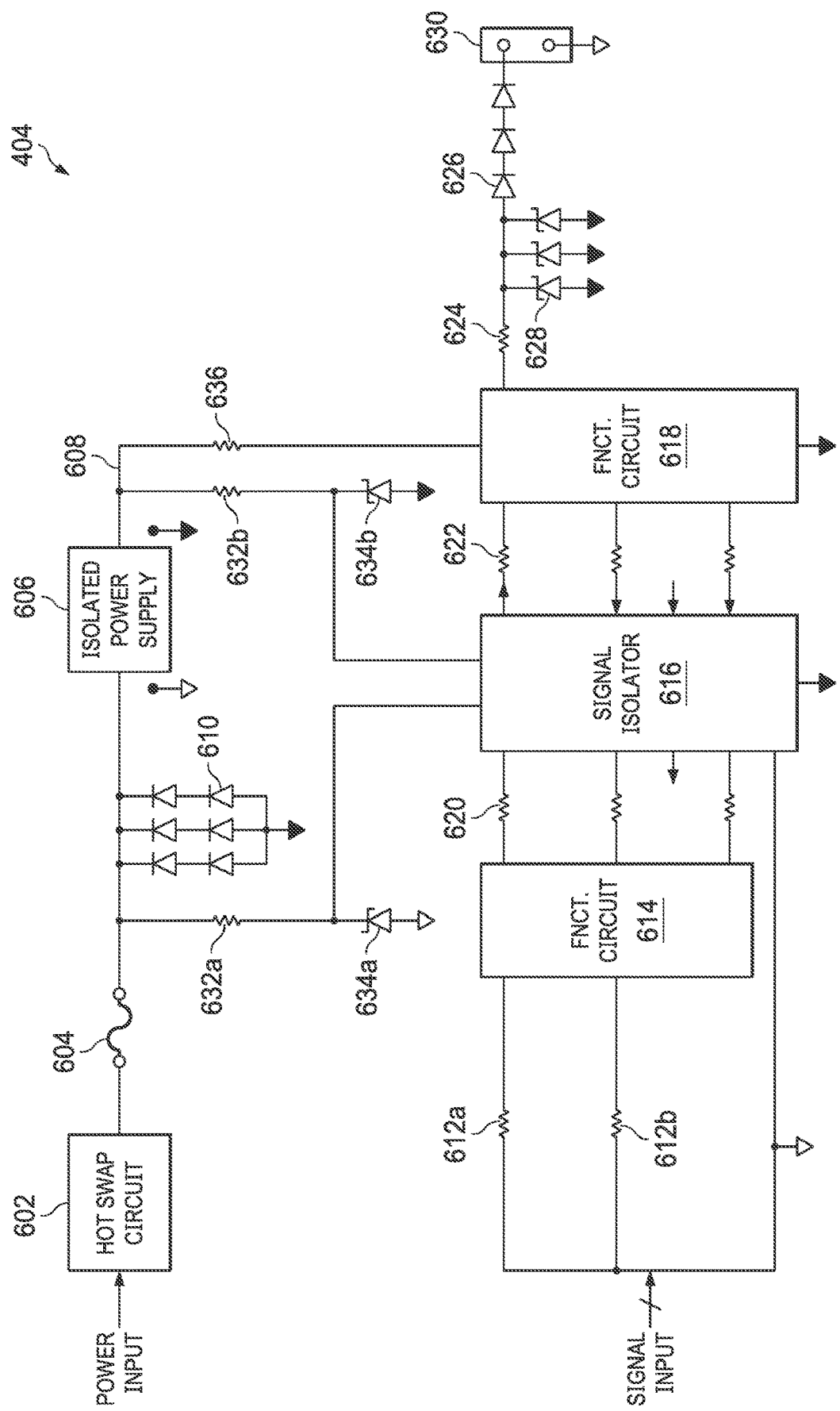
FIG. 6 illustrates an example implementation of intrinsic safety barrier hardware in the intrinsic safety barrier of FIG. 4 according to this disclosure.

FIG. 6 illustrates an example implementation of intrinsic safety barrier hardware 404 in the intrinsic safety barrier 400 of FIG. 4 according to this disclosure. The components forming the intrinsic safety barrier hardware 404 could, for example, reside on the circuit board assembly 214 used within an intrinsic safety barrier 210. Note that the example implementation of the IS barrier hardware 404 shown in FIG. 6 is for illustration only. The IS barrier hardware 404 could be implemented in any other suitable manner without departing from the scope of this disclosure.

As shown in FIG. 6, an input power signal received by the IS barrier hardware 404 is provided to a hot swap circuit 602. The input power signal could be provided from the output connector 504 of the isolation module 402. Alternatively, the input power signal could be provided from an I/O channel, such as one of multiple I/O channels supported by an I/O module 406. The hot swap circuit 602 allows the IS barrier hardware 404 to be inserted into a powered-on system and limits in-rush current during the insertion. The input power signal from the hot swap circuit 602 is received at a fuse 604. The fuse 604 represents a structure configured to break in order to prevent excessive current from flowing further into the IS barrier hardware 404. An isolated power supply 606 can be positioned between the fuse 604 and a power supply line 608. The isolated power supply 606 receives the input power signal from the fuse 604 and provides a corresponding output power signal over the power supply line 608. The isolated power supply 606 also helps to electrically isolate the fuse 604 from the power supply line 608 and could include a transformer.

Multiple Zener diodes 610 are connected in series and in parallel with each other and are coupled between ground and the input to the isolated power supply 606. The Zener diodes 610 help to clamp the voltage that appears at the input to the isolated power supply 606. Note that the use of the Zener diodes 610 is optional and they may be omitted if power is drawn through the output connector 504 of the isolation module 402. If power is drawn from one of the I/O channels of an I/O module 406, the Zener diodes 610 can be used. Any suitable Zener diodes 610 could be used here. Note that while the set of Zener diodes 610 includes three parallel-coupled lines (each line with two series-coupled Zener diodes), any number of Zener diodes 610 in any suitable arrangement could be used.

The IS barrier hardware 404 receives an input data signal from an I/O module 406 or other source. In this example, the input data signal is a differential data signal, such as an RS485 signal, so again there are separate electrical paths for the positive and negative portions of the input data signal. However, this is not required, and a single-ended input data signal could be used here.

The two portions of the input data signal pass through respective resistors 612a-612b. Each of the resistors 612a-612b could have any suitable resistance. The two portions of the input data signal are provided from the resistors 612a-612b to a functional circuit 614. The functional circuit 614 operates to condition the differential data signal for input to a signal isolator 616. For example, the functional circuit 614 could perform level shifting and signal conditioning to prepare the differential data signal for input to the signal isolator 616.

The signal isolator 616 operates to electrically isolate signals being used by the functional circuit 614 and a functional circuit 618. For example, the signal isolator 616 could receive an incoming signal from the functional circuit 614 and provide an electrically-isolated replica of the signal to the functional circuit 618 (or vice versa). As a particular example, the signal isolator 616 could use one or more transformers to electrically isolate the signals used by the functional circuit 614 and the functional circuit 618. Various resistors 620 are used on the signal lines between the functional circuit 614 and the signal isolator 616. Also, various resistors 622 are used on the signal lines between the signal isolator 616 and the functional circuit 618. Each of the resistors 620 and 622 could have any suitable resistance.

The functional circuit 618 processes the incoming data signal from the signal isolator 616 into a form suitable for transmission out of the intrinsic safety barrier 400 and to a field device or other destination. For example, the functional circuit 618 could convert the differential data signal into a single-ended data signal that is output from the functional circuit 618. The functional circuit 618 could also ensure that the single-ended data signal complies with any specified protocol or other guidelines, such as by ensuring that the single-ended data signal has a desired voltage or current level. The functional circuit 618 could further optionally supply power received from the isolated power supply 606 to the field device or other destination. In some embodiments, the functional circuit 618 could represent a digital I/O circuit, although any other suitable circuitry could be used in the functional circuit 618.

The output from the functional circuit 618 passes through a resistor 624 and multiple diodes 626. The resistor 624 is also coupled to multiple parallel-coupled Zener diodes 628. The resistor 624 could have any suitable resistance. Any suitable diodes 626 could be used here. Note that while three series-coupled diodes 626 are used here, any number of diodes 626 (including a single diode) could be used. Any suitable Zener diodes 628 could be used here. Note that while three parallel-coupled Zener diodes 628 are used here, any number of Zener diodes 628 (including a single diode) could be used. The output from the functional circuit 618 is provided to a field device or other destination through an output connector 630, which could be coupled to any suitable pathway to the destination.

The signal isolator 616 and the functional circuit 618 can receive power from the isolated power supply 606. In this example, the two sides of the signal isolator 616 are coupled to the isolated power supply 606 through resistors 632a-632b, respectively. Each of the resistors 632a-632b is respectively coupled in series to a Zener diode 634a-634b. Each of the resistors 632a-632b could have any suitable resistance. Any suitable Zener diodes 634a-634b could be used here, such as those used to provide a 3.3V reference to the signal isolator 616. Also, the functional circuit 618 is coupled to the isolated power supply 606 through a resistor 636. The resistor 636 could have any suitable resistance.

It should be noted that the components 612a-612b, 614-630 shown in FIG. 6 are used to handle a single I/O channel associated with an I/O module 406 or other device. These components could be replicated any suitable number of times to support communications over any suitable number of I/O channels. As a particular example, the IS barrier hardware 404 could include components that support sixteen or thirty-two I/O channels. Moreover, the components 614-622 are used here specifically to support a digital output channel. The IS barrier hardware 404 could include other components in place of the components 614-622 in order to support analog, digital, or other types of input or output channels.

Although FIG. 6 illustrates one example implementation of intrinsic safety barrier hardware 404 in the intrinsic safety barrier 400 of FIG. 4, various changes may be made to FIG. 6. For example, while specific components and specific values (like voltages, currents, and powers) are provided above, these are examples only, and any other suitable components or values could be used in the IS barrier hardware 404. Also, if a single-ended input data signal is received, a single path may be used between the I/O module input and the output connector 630.

Figure 7:
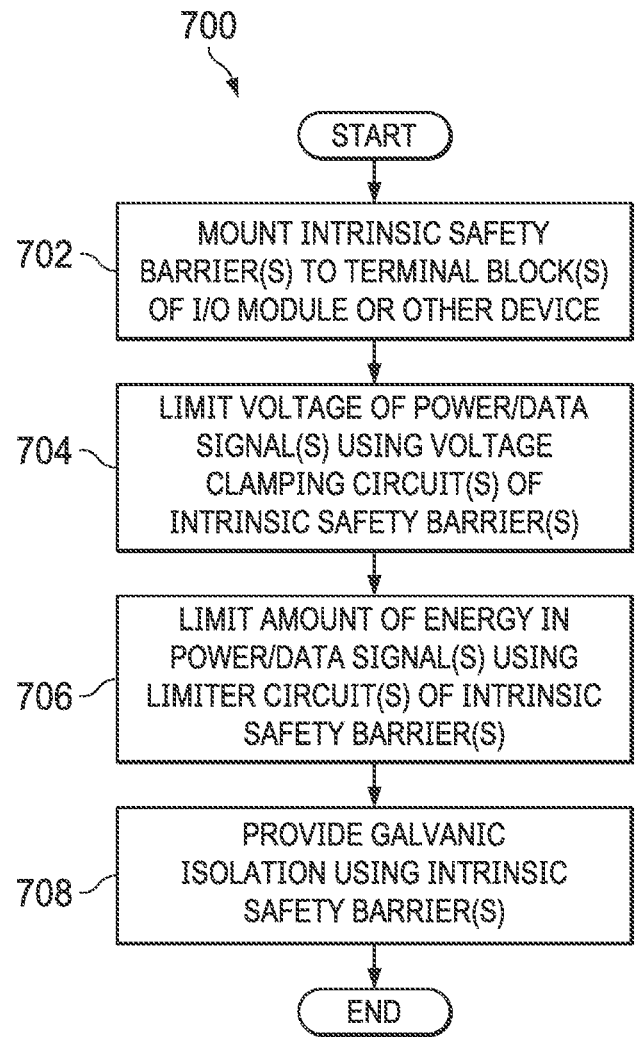
FIG. 7 illustrates an example method for using an intrinsic safety barrier mountable on a terminal block of an I/O module or other device according to this disclosure.

FIG. 7 illustrates an example method 700 for using an intrinsic safety barrier mountable on a terminal block of an I/O module or other device according to this disclosure. For ease of explanation, the method 700 is described as involving the use of the intrinsic safety barriers 210 with the modules 202a-202b of FIGS. 2 and 3, which could be used in the system 100 of FIG. 1. However, the method 700 may involve the use of any suitable intrinsic safety barriers with any suitable device(s) in any suitable system.

As shown in FIG. 7, one or more intrinsic safety barriers are mounted to at least one terminal block of an I/O module or other device at step 702. This could include, for example, personnel inserting connectors 220 of the circuit board assembly 214 of each intrinsic safety barrier 210 directly into a terminal block 206. This could alternatively include personnel coupling the circuit board assembly 214 of each intrinsic safety barrier 210 to an adapter board 218 and inserting connectors 220 of the adapter board 218 into the terminal block 206. In general, each intrinsic safety barrier 210 could be mounted to a terminal block 206 in any suitable manner (whether direct or indirect).

Optionally, one or more voltage clamping circuits of the intrinsic safety barrier(s) are used to limit the voltage(s) of one or more power or data signals at step 704. This could include, for example, one or more voltage clamping circuits 410 of the isolation module 402 operating to clamp the voltages in power and data signals transported through the isolation module 402. As a particular example, this could include the components of the isolation module 402 shown in FIG. 5 operating to clamp the voltages in power and data signals transported through the isolation module 402. This step is identified as being optional since the intrinsic safety barriers 210 may (but need not) include any isolation modules 402, so the intrinsic safety barriers 210 may or may not perform this function.

One or more limiter circuits of the intrinsic safety barrier(s) are used to limit the amount(s) of energy contained in the one or more power or data signals at step 706. This could include, for example, one or more energy-limiting circuits 416 of the IS barrier hardware 404 operating to limit the energy contained in the power and data signals transported through the IS barrier hardware 404. As a particular example, this could include the components of the IS barrier hardware 404 shown in FIG. 6 operating to limit the energy contained in the power and data signals transported through the IS barrier hardware 404.

Optionally, galvanic isolation is provided using the intrinsic safety barrier(s) at step 708. This could include, for example, the isolation module 402 or the IS barrier hardware 404 providing galvanic isolation for the power and data signals being transported through the intrinsic safety barrier 210. As particular examples, this could include one or more of the isolated power supply 512 of the isolation module 402 and the isolated power supply 606 of the IS barrier hardware 404 providing the galvanic isolation for the power and data signals being transported through the intrinsic safety barrier 210. Again, this step is identified as being optional since the intrinsic safety barriers 210 may (but need not) include any isolation modules 402, so the intrinsic safety barriers 210 may or may not perform this function.

Although FIG. 7 illustrates one example of a method 700 for using an intrinsic safety barrier mountable on a terminal block of an I/O module or other device, various changes may be made to FIG. 7. For example, while shown as a series of steps, various steps in FIG. 7 could overlap, occur in parallel, occur in a different order, or occur any number of times. As a particular example, steps 704-708 may generally overlap during operation of an intrinsic safety barrier 210.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   one or more intrinsic safety barriers, each intrinsic safety barrier configured to receive at least one data or power signal, limit an amount of energy in the at least one data or power signal, and output the at least one energy-limited data or power signal;
   wherein each intrinsic safety barrier comprises:
   at least one limiter circuit configured to limit the amount of energy in the at least one data or power signal;
   a circuit board assembly comprising the at least one limiter circuit; and
   a sleeve configured to electrically isolate the circuit board assembly from any adjacent circuit board assemblies, the sleeve including a first structure to receive the circuit board;
   a handle including a second structure to facilitate the insertion and removal of the intrinsic safety barrier into and out of the sleeve,
   wherein each intrinsic safety barrier is configured to be mounted on a terminal block comprising multiple terminals.

2. The apparatus of claim 1, further comprising:
   electrical connectors configured to be inserted into the terminal block and to electrically contact connector points of the terminal block; and
   an adapter board configured to be coupled to the one or more intrinsic safety barriers and to provide electrical connections between the one or more intrinsic safety barriers and the electrical connectors.

3. The apparatus of claim 2, wherein:
   the apparatus comprises multiple intrinsic safety barriers; and
   the adapter board allows the intrinsic safety barriers to be spaced at a larger interval than the terminals of the terminal block.

4. The apparatus of claim 1, wherein each intrinsic safety barrier is configured to provide galvanic isolation between multiple devices or systems coupled to the intrinsic safety barrier.

5. The apparatus of claim 1, wherein each intrinsic safety barrier allows hot insertion and removal of the intrinsic safety barrier to and from the terminal block.

6. The apparatus of claim 1, wherein each limiter circuit comprises a current limiter.

7. A system comprising:
   a module comprising at least one input/output (I/O) channel;
   a terminal block comprising terminals configured to provide electrical connections for the at least one I/O channel; and
   a barrier assembly comprising one or more intrinsic safety barriers, each intrinsic safety barrier configured to receive at least one data or power signal, limit an amount of energy in the at least one data or power signal, and output the at least one energy-limited data or power signal;
   wherein each intrinsic safety barrier comprises:
   at least one limiter circuit configured to limit the amount of energy in the at least one data or power signal,
   a circuit board assembly comprising the at least one limiter circuit; and
   a sleeve configured to electrically isolate the circuit board assembly from any adjacent circuit board assemblies, the sleeve including a first structure to receive the circuit board; and
   a handle including a second structure to facilitate the insertion and removal of the intrinsic safety barrier into and out of the sleeve,
   wherein each intrinsic safety barrier is configured to be mounted on the terminal block.

8. The system of claim 7, wherein the barrier assembly further comprises:
   electrical connectors configured to be inserted into the terminal block and to electrically contact connector points of the terminal block; and
   an adapter board configured to be coupled to the one or more intrinsic safety barriers and to provide electrical connections between the one or more intrinsic safety barriers and the electrical connectors.

9. The system of claim 8, wherein:
   the barrier assembly comprises multiple intrinsic safety barriers; and
   the adapter board allows the intrinsic safety barriers to be spaced at a larger interval than the terminals of the terminal block.

10. The system of claim 7, wherein each intrinsic safety barrier is configured to provide galvanic isolation between multiple devices or systems coupled to the intrinsic safety barrier.

11. The system of claim 7, wherein each intrinsic safety barrier allows hot insertion and removal of the intrinsic safety barrier to and from the terminal block.

12. The system of claim 7, wherein each limiter circuit comprises a current limiter.

13. The system of claim 7, wherein at least one of:
the module comprises one of multiple modules;
the terminal block comprises one of multiple terminal blocks; and
the barrier assembly comprises one of multiple isolation barrier assemblies.

14. The system of claim 7, wherein the at least one I/O channel comprises at least one reconfigurable I/O channel.

15. A method comprising:
mounting one or more intrinsic safety barriers on a terminal block, the terminal block comprising multiple terminals; and
using each intrinsic safety barrier to receive at least one data or power signal, limit an amount of energy in the at least one data or power signal, and output the at least one energy-limited data or power signal;
wherein each intrinsic safety barrier comprises at least one limiter circuit configured to limit the amount of energy in the at least one data or power signal, a circuit board assembly comprising the at least one limiter circuit, and the method further comprises using sleeves to electrically isolate adjacent circuit board assemblies of the intrinsic safety barriers, the sleeve including a first structure to receive the circuit board, the method further comprises using a handle including a second structure to facilitate the insertion and removal of the intrinsic safety barriers into and out of the sleeve.

16. The method of claim 15, wherein mounting the one or more intrinsic safety barriers on the terminal block comprises:
coupling the one or more intrinsic safety barriers to an adapter board; and
inserting electrical connectors of the adapter board into the terminal block;
wherein the adapter board provides electrical connections between the one or more intrinsic safety barriers and the electrical connectors.

17. The method of claim 15, wherein:
multiple intrinsic safety barriers are mounted on the terminal block.

18. The method of claim 15, further comprising:
using each intrinsic safety barrier, providing galvanic isolation between multiple devices or systems coupled to the intrinsic safety barrier.

* * * * *